(12) United States Patent
Laberge et al.

(10) Patent No.: US 8,836,802 B2
(45) Date of Patent: Sep. 16, 2014

(54) METHOD OF DEFINING CAMERA SCAN MOVEMENTS USING GESTURES

(75) Inventors: Jason Laberge, New Brighton, MN (US); Pallavi Dharwada, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 478 days.

(21) Appl. No.: 13/052,879

(22) Filed: Mar. 21, 2011

(65) Prior Publication Data

US 2012/0242850 A1 Sep. 27, 2012

(51) Int. Cl.
*H04N 5/232* (2006.01)
*H04N 7/18* (2006.01)
*H04N 5/247* (2006.01)

(52) U.S. Cl.
CPC .......... *H04N 5/23206* (2013.01); *H04N 5/247* (2013.01); *H04N 7/181* (2013.01); *H04N 5/23216* (2013.01)
USPC ........ 348/211.8; 348/143; 348/153; 348/159; 348/211.99; 348/211.1; 348/211.2; 348/211.4; 348/211.11; 348/211.14

(58) Field of Classification Search
CPC .............. H04N 5/232; H04N 5/23203; H04N 5/23206; H04N 7/181
USPC ......... 348/143, 150, 151, 152, 153, 154, 155, 348/158, 159, 211.99, 211.1, 211.2, 211.3, 348/211.4, 211.5, 211.6, 211.7, 211.8, 348/211.9, 211.11, 211.13, 211.14
See application file for complete search history.

(56) References Cited

U.S. PATENT DOCUMENTS

| 4,992,866 | A | | 2/1991 | Morgan |
| 5,483,261 | A | | 1/1996 | Yasutake |
| 5,793,367 | A | * | 8/1998 | Taguchi ........................ 715/756 |
| 5,872,594 | A | | 2/1999 | Thompson |
| 6,208,329 | B1 | | 3/2001 | Ballare |

(Continued)

FOREIGN PATENT DOCUMENTS

WO    WO-9849663 A1    11/1998

OTHER PUBLICATIONS

"U.S. Appl. No. 12/704,987, Final Office Action mailed Jul. 29, 2013", 9 pgs.

(Continued)

*Primary Examiner* — Twyler Haskins
*Assistant Examiner* — Peter Chon
(74) *Attorney, Agent, or Firm* — Schwegman Lundberg & Woessner, P.A.

(57) ABSTRACT

Some embodiments relate to a method of displaying items on a touch-sensitive display. The method includes showing a camera on the touch-sensitive display and detecting contact with the camera on the touch-sensitive display. The method further includes manipulating the camera based on a gesture conducted on the touch-sensitive display, wherein the gesture includes making contact with the touch sensitive display at a plurality of locations. The plurality of locations are arranged in a pattern that defines operation of the camera. Other embodiments relate to a method that includes showing a menu on the touch-sensitive display that includes a plurality of camera movement operations and detecting contact with the camera on the touch-sensitive display. The method further includes detecting contact with the menu on the touch-sensitive display to select a particular camera movement operation and manipulating the camera based on a gesture conducted on the touch-sensitive display.

9 Claims, 11 Drawing Sheets

(56) References Cited

U.S. PATENT DOCUMENTS

| | | | |
|---|---|---|---|
| 6,542,191 | B1 | 4/2003 | Yonezawa |
| 6,680,746 | B2 | 1/2004 | Kawai et al. |
| 6,697,105 | B1 | 2/2004 | Kato et al. |
| 6,888,565 | B1 | 5/2005 | Tanaka et al. |
| 6,954,224 | B1 | 10/2005 | Okada et al. |
| 6,965,376 | B2 | 11/2005 | Tani et al. |
| 6,965,394 | B2 | 11/2005 | Gutta et al. |
| 6,973,200 | B1 | 12/2005 | Tanaka et al. |
| 6,992,702 | B1 * | 1/2006 | Foote et al. ............... 348/211.8 |
| 7,030,861 | B1 | 4/2006 | Westerman et al. |
| 7,061,525 | B1 | 6/2006 | Tanaka et al. |
| 7,183,944 | B2 | 2/2007 | Gutta et al. |
| 7,278,115 | B1 | 10/2007 | Conway et al. |
| 7,362,221 | B2 | 4/2008 | Katz |
| 7,394,367 | B1 | 7/2008 | Aupperle et al. |
| 7,411,575 | B2 | 8/2008 | Hill et al. |
| 7,479,949 | B2 | 1/2009 | Jobs et al. |
| 7,519,223 | B2 | 4/2009 | Dehlin et al. |
| 7,535,463 | B2 | 5/2009 | Wilson |
| 8,085,300 | B2 * | 12/2011 | Ikeda ............................ 348/150 |
| 8,570,286 | B2 | 10/2013 | Laberge et al. |
| 8,638,371 | B2 | 1/2014 | Laberge et al. |
| 2001/0026263 | A1 | 10/2001 | Kanamori et al. |
| 2002/0067412 | A1 * | 6/2002 | Kawai et al. .................. 348/211 |
| 2005/0036036 | A1 | 2/2005 | Stevenson et al. |
| 2005/0079896 | A1 | 4/2005 | Kokko et al. |
| 2005/0225634 | A1 | 10/2005 | Brunetti et al. |
| 2006/0026521 | A1 | 2/2006 | Hotelling et al. |
| 2006/0034043 | A1 | 2/2006 | Hisano et al. |
| 2006/0036944 | A1 | 2/2006 | Wilson |
| 2006/0187196 | A1 | 8/2006 | Underkoffler et al. |
| 2006/0267966 | A1 | 11/2006 | Grossman et al. |
| 2007/0146337 | A1 | 6/2007 | Ording et al. |
| 2007/0171273 | A1 | 7/2007 | Saleh et al. |
| 2007/0229471 | A1 | 10/2007 | Kim et al. |
| 2008/0013826 | A1 | 1/2008 | Hillis et al. |
| 2008/0129686 | A1 | 6/2008 | Han |
| 2008/0143559 | A1 | 6/2008 | Dietz et al. |
| 2008/0168403 | A1 | 7/2008 | Westerman et al. |
| 2008/0211775 | A1 * | 9/2008 | Hotelling et al. ............. 345/168 |
| 2008/0231610 | A1 | 9/2008 | Hotelling et al. |
| 2009/0040188 | A1 | 2/2009 | Shu |
| 2009/0084612 | A1 | 4/2009 | Mattice et al. |
| 2009/0160785 | A1 | 6/2009 | Chen et al. |
| 2009/0262091 | A1 | 10/2009 | Ikeda et al. |
| 2010/0053219 | A1 | 3/2010 | Kommann |
| 2010/0058252 | A1 | 3/2010 | Ko |
| 2010/0138763 | A1 | 6/2010 | Kim |
| 2010/0188423 | A1 | 7/2010 | Ikeda |
| 2010/0192109 | A1 | 7/2010 | Westerman et al. |
| 2010/0211920 | A1 | 8/2010 | Westerman et al. |
| 2010/0259486 | A1 | 10/2010 | Anson et al. |
| 2010/0304731 | A1 | 12/2010 | Bratton et al. |
| 2011/0093822 | A1 | 4/2011 | Sherwani |
| 2011/0117526 | A1 | 5/2011 | Wigdor et al. |
| 2011/0181526 | A1 | 7/2011 | Shaffer et al. |
| 2011/0199314 | A1 | 8/2011 | Laberge et al. |
| 2011/0199386 | A1 | 8/2011 | Dharwada et al. |
| 2011/0199495 | A1 | 8/2011 | Laberg et al. |
| 2011/0199516 | A1 | 8/2011 | Laberge et al. |
| 2011/0225553 | A1 | 9/2011 | Abramson et al. |
| 2011/0239155 | A1 | 9/2011 | Christie |
| 2012/0023509 | A1 | 1/2012 | Blumenberg |
| 2012/0088526 | A1 | 4/2012 | Lindner |

OTHER PUBLICATIONS

"U.S. Appl. No. 12/704,987, Response filed Aug. 6, 2013 to Final Office Action mailed Jul. 29, 2013", 6 pgs.

"U.S. Appl. No. 12/704,886, Examiner Interview Summary mailed May 20, 2013", 4 pgs.

"U.S. Appl. No. 12/704,886, Non Final Office Action mailed Apr. 12, 2013", 4 pgs.

"U.S. Appl. No. 12/704,886, Notice of Allowance mailed May 23, 2013", 6 pgs.

"U.S. Appl. No. 12/704,886, Response filed Mar. 25, 2013 to Restriction Requirement mailed Mar. 18, 2013", 4 pgs.

"U.S. Appl. No. 12/704,886, Response filed May 14, 2013 to Non Final Office Action mailed Apr. 12, 2013", 6 pgs.

"U.S. Appl. No. 12/704,886, Restriction Requirement mailed Mar. 18, 2013", 5 pgs.

"U.S. Appl. No. 12/704,950, Advisory Action mailed May 8, 2012", 5 pgs.

"U.S. Appl. No. 12/704,950, Final Office Action mailed Mar. 8, 2012", 8 pgs.

"U.S. Appl. No. 12/704,950, Final Office Action mailed Oct. 4, 2012", 10 pgs.

"U.S. Appl. No. 12/704,950, Non Final Office Action mailed Jun. 15, 2012", 9 pgs.

"U.S. Appl. No. 12/704,950, Non Final Office Action mailed Dec. 16, 2011", 5 pgs.

"U.S. Appl. No. 12/704,950, Response filed Jan. 5, 2012 to Non Final Office Action mailed Dec. 16, 2011", 8 pgs.

"U.S. Appl. No. 12/704,950, Response filed Apr. 25, 2012 to Final Office Action mailed Mar. 8, 2012", 8 pgs.

"U.S. Appl. No. 12/704,950, Response filed Sep. 14, 2012 Non Final Office Action mailed Jun. 15, 2012", 10 pgs.

"U.S. Appl. No. 12/704,950, Supplemental Amendment and Response filed Jun. 7, 2012 to Final Office Action mailed Mar. 8, 2012 and Advisory Action mailed May 8, 2012", 10 pgs.

"U.S. Appl. No. 12/704,987, Examiner Interview Summary mailed Aug. 23, 2012", 3 pgs.

"U.S. Appl. No. 12/704,987, Final Office Action mailed Nov. 13, 2012", 8 pgs.

"U.S. Appl. No. 12/704,987, Non Final Office Action mailed Jan. 2, 2013", 8 pgs.

"U.S. Appl. No. 12/704,987, Non Final Office Action mailed Jul. 20, 2012", 8 pgs.

"U.S. Appl. No. 12/704,987, Response filed Mar. 22, 2013 to Non Final Office Action mailed Jan. 2, 2013", 7 pgs.

"U.S. Appl. No. 12/704,987, Response filed Aug. 17, 2012 to Non-Final Office Action mailed Jul. 20, 2012", 6 pgs.

"U.S. Appl. No. 12/704,987, Response filed Dec. 3, 2012 to Final Office Action mailed Nov. 13, 2012", 5 pgs.

"U.S. Appl. No. 12/705,026, Response filed Mar. 25, 2013 to Final Office Action mailed Feb. 12, 2013", 5 pgs.

"U.S. Appl. No. 12/705,026, Examiner Interview Summary mailed Mar. 28, 2013", 3 pgs.

"U.S. Appl. No. 12/705,026, Examiner Interview Summary mailed May 22, 2013", 3 pgs.

"U.S. Appl. No. 12/705,026, Final Office Action mailed Feb. 12, 2013", 10 pgs.

"U.S. Appl. No. 12/705,026, Non Final Office Action mailed Apr. 11, 2013", 7 pgs.

"U.S. Appl. No. 12/705,026, Non Final Office Action mailed Nov. 23, 2012", 9 pgs.

"U.S. Appl. No. 12/705,026, Response filed Jan. 2, 2013 to Non Final Office Action mailed Nov. 23, 2012", 9 pgs.

"Atmel's New Family of Touch Screen Solutions Enable Two Touch Gestures for Intuitive User Interfaces", http://news.thomasnet.com/companystory/821709, (Oct. 22, 2008).

"Getac Announces Technology Breakthrough With Resistive-Type Multi-Touch Technology for "Hands-On" Applications With or Without Gloves", http://www.getac.com/news/edm/multi-touch.html, Getac Press Release, (Oct. 6, 2009).

"HTC TouchFLO review", http://msmoblies.com/news.php/6616.html, (Aug. 16, 2007).

"Touch Screen and User Interface", http://www.sony.jp/products/overseas/contents/pickup/contents/touch_screen/index.html, Undated, (Downloaded Oct. 29, 2009).

"TOUCH1600 Touch Screen DVR", http://helpdesk.portasystems.com/download/security/dvr.pdf, Porta Systems Corp., (Sep. 2008).

Davies, Chris, "Getac V100 Tablet PC gets glove-friendly multitouch display", http://www.slashgear.com/getac-v100-tablet-pc-gets-glove-friendly-multitouch-display-0759517/, (Oct. 7, 2009).

(56) References Cited

OTHER PUBLICATIONS

Niper, E. D, "INEL central alarm monitoring and assessment system", Nuclear materials management, 12, (1983), 150-155.

Posey, Brien, "Touch screen gestures", http://itknowledgeexchange.techtarget.com/brien-posey/touch-screen-gestures/, Brien Posey's Windows Blog, (Mar. 31, 2009).

"U.S. Appl. No. 12/705,026, Response filed Feb. 11, 2014 to Non Final Office Action mailed Jan. 2, 2012", 6 pgs.

"U.S. Appl. No. 12/704,987, Notice of Allowance mailed Sep. 17, 2013", 8 pgs.

"U.S. Appl. No. 12/705,026, Final Office Action mailed Sep. 9, 2013", 8 pgs.

"U.S. Appl. No. 12/705,026, Response filed Dec. 9, 2013 to Final Office Action mailed Sep. 9, 2013", 6 pgs.

"U.S. Appl. No. 12/705,026, Non Final Office Action mailed Jan. 2, 2012", 7 pgs.

"U.S. Appl. No. 12/705,026, Response filed May 20, 2013 to Non Final Office Action mailed Apr. 11, 2013", 6 pgs.

"Chinese Application Serial No. 201110068251.X, Amendment filed Jun. 3, 2013", (w/ English Translation of Claims), 5 pgs.

\* cited by examiner

METHOD OF DEFINING CAMERA SCAN MOVEMENTS USING GESTURES

BACKGROUND

Monitoring large and complex environments is a challenging task for security operators because situations evolve quickly, information is distributed across multiple screens and systems, uncertainty is rampant, decisions can have high risk and far reaching consequences. Responses must be quick and coordinated when problems occur.

Many existing security systems perform monitoring by having operators utilize a series of cameras. Current camera monitoring systems are often limited to mouse and keyboard input from a single person which is error prone and slow.

In addition, current systems often do not provide users with context in terms of where cameras are located, their current orientation relative to the environment, and what is in the current camera's viewable range. Touch interactive systems that rely on intuitive gestures as input from users offer a significant opportunity to better support camera monitoring and manipulation, which can improve situation awareness and response for security operators.

The increased market present of single-touch and multi-touch interaction devices such as the iPhone, GPS navigators, HP TouchSmart laptop, Microsoft Surface and Blackberry mobile devices offer a significant opportunity to investigate new gesture-based interaction techniques that can improve operator performance during complex monitoring and response tasks.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
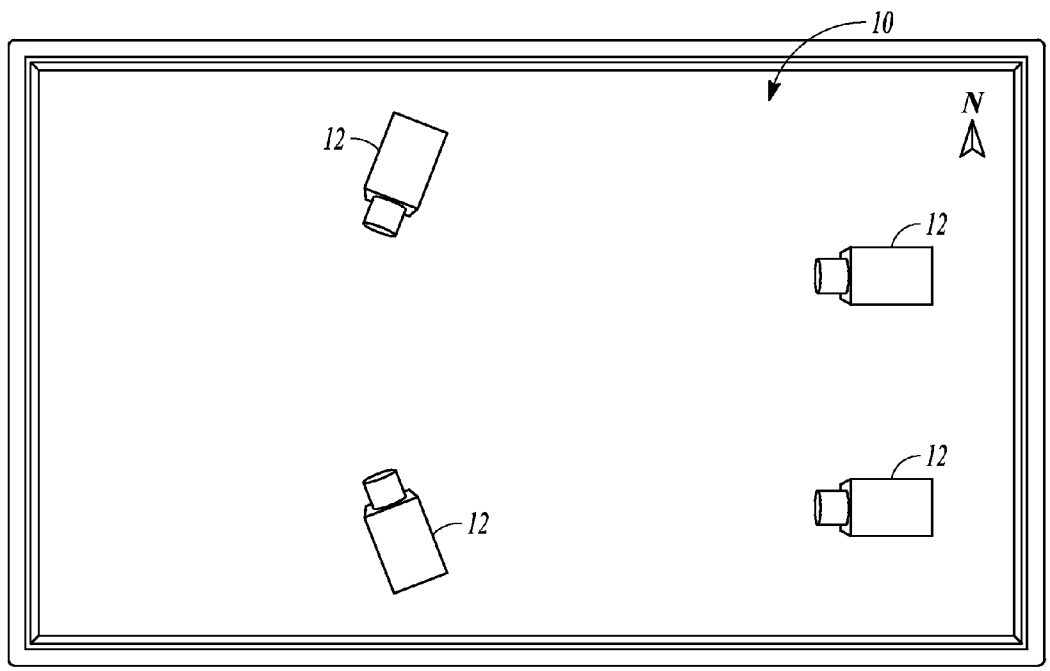
FIG. 1 illustrates a touch-sensitive display that shows an environment which includes one or more cameras shown on the display.

FIGS. 1-5 illustrate an example method of manipulating assets shown on a touch-sensitive display 10. As shown in FIG. 1, the method includes showing one or more cameras 12 on a touch-sensitive display 10.

Figure 2A:
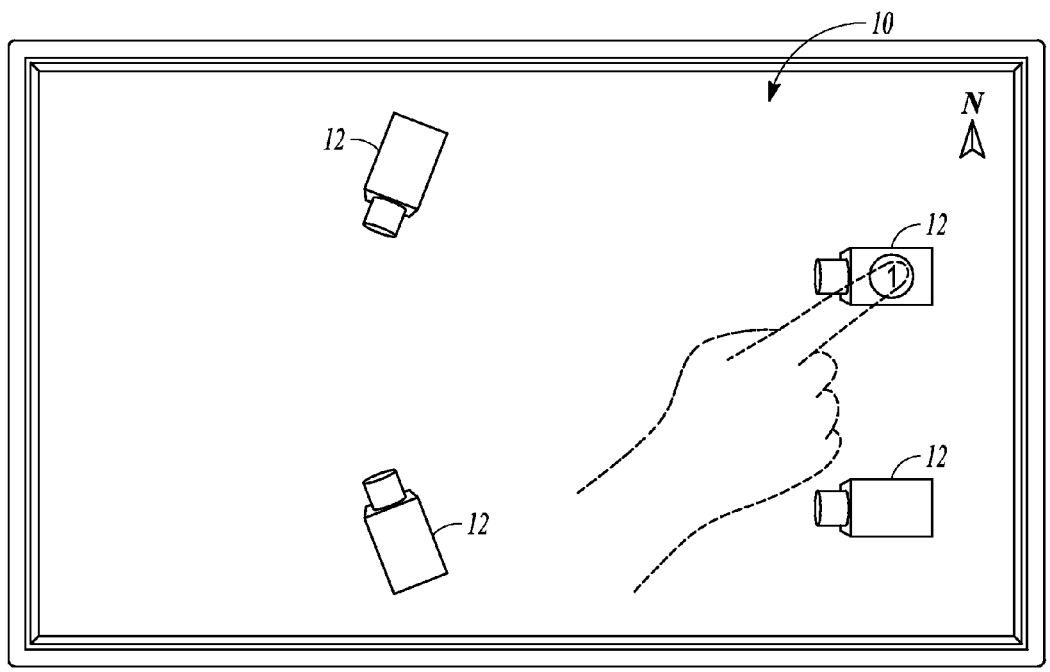
FIGS. 2A-2F illustrate an example method of manipulating operation of a camera based on a pattern of a plurality of contacts with the touch sensitive display.
Figure 2B:
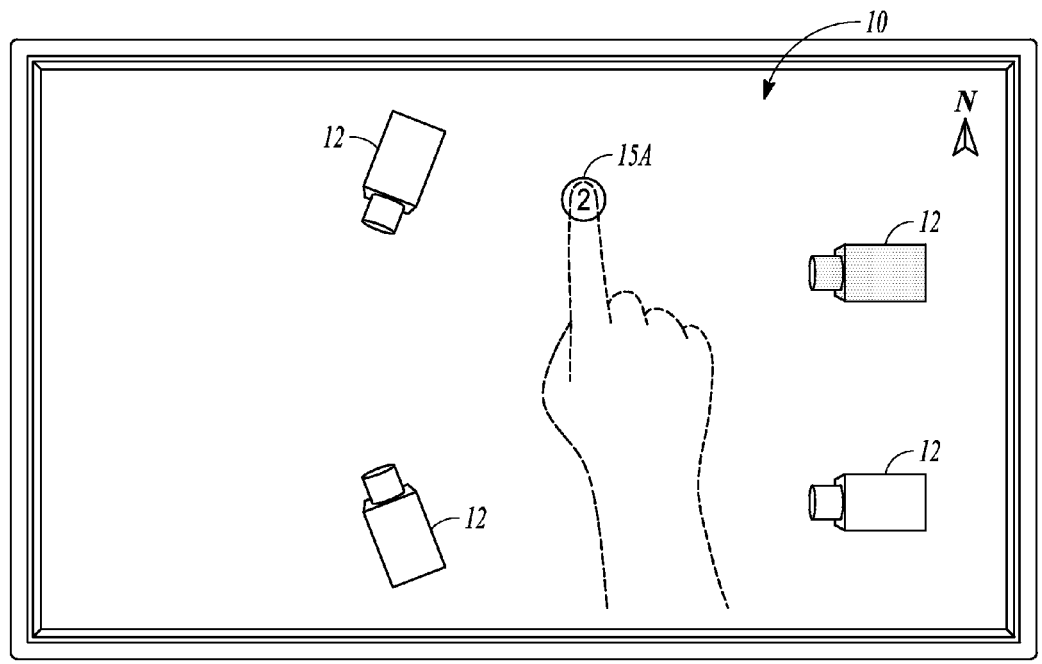
Figure 2C:
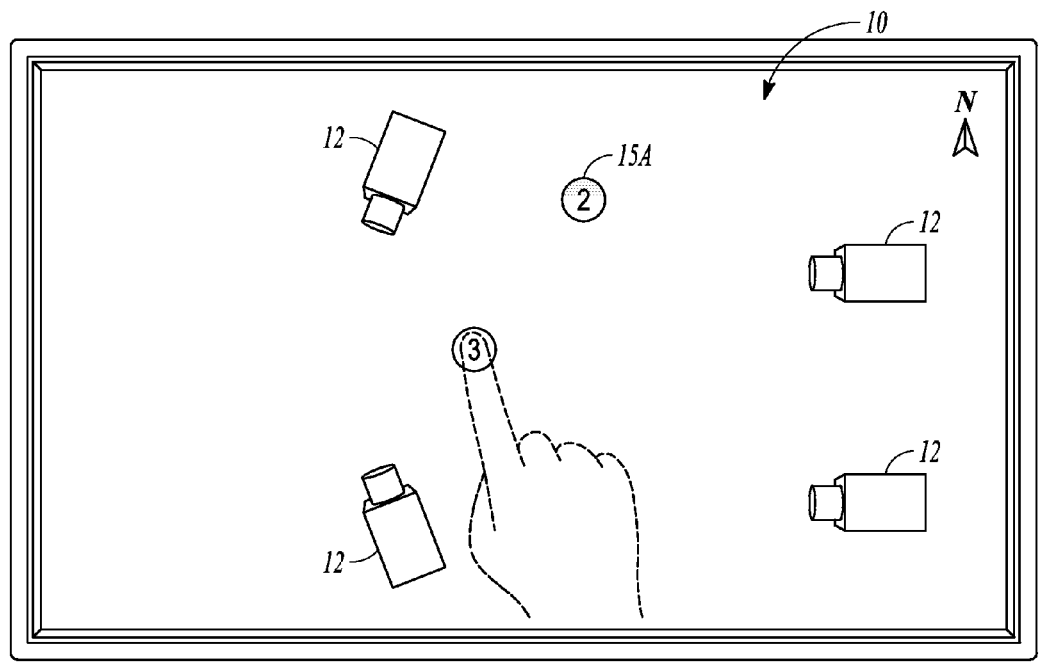
Figure 2D:
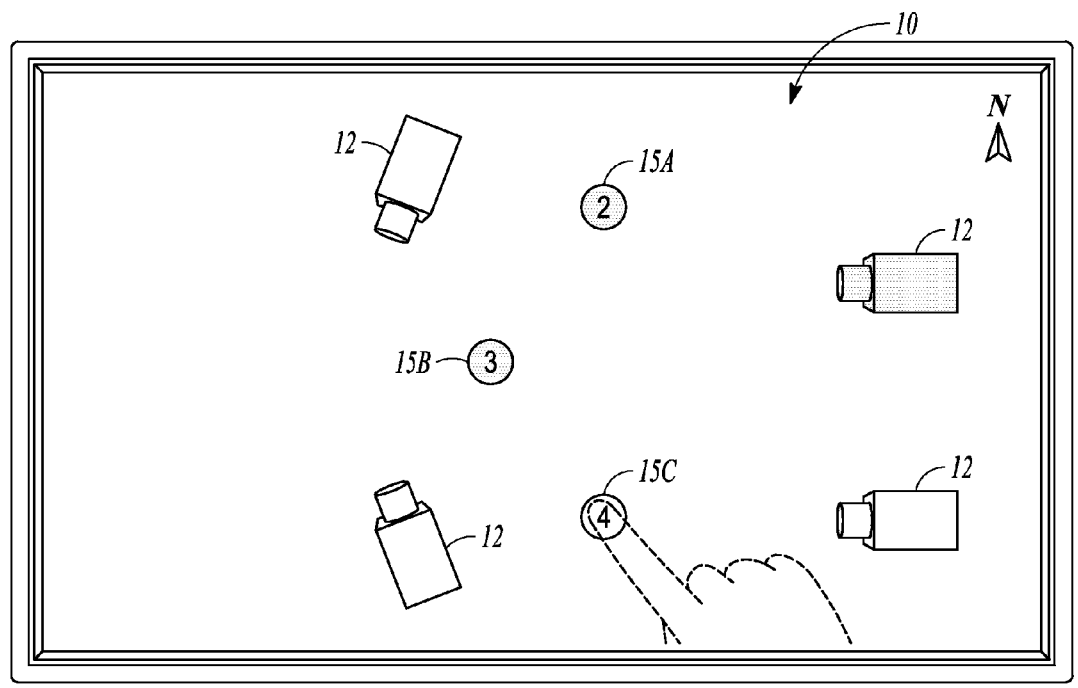

One example embodiment is illustrated in FIGS. 2A-2F. FIG. 2A illustrates that the method further includes detecting contact with the camera 12 on the touch-sensitive display 10 (shown as contacting one of the cameras 12). FIGS. 2B-2E illustrate that the method further includes manipulating the camera 12 based on a gesture conducted on the touch-sensitive display 10. As shown most clearly in FIGS. 2B-2D, the gesture includes making contact with the touch sensitive display 10 at a plurality of locations 15A-15C. The plurality of locations 15A-15C being arranged in a pattern that defines operation of the camera 12.

In the example embodiment illustrated in FIGS. 2A-2F, a two dimensional map 16 is shown on the touch-sensitive display 10. In other embodiments, showing a camera 12 on the touch-sensitive display 10 may instead include showing a three dimensional model on the touch-sensitive display 10.

In some embodiments, manipulating the camera 12 based on a gesture conducted on the touch-sensitive display 10 includes manipulating zoom functioning of the camera based on the pattern of the plurality of locations 15A-15C on the touch sensitive display 10. The degree of zoom may depend in part on the relative position of the plurality of locations 15A-15C on the touch sensitive display 10.

Embodiments are also contemplated where manipulating the camera 12 based on a gesture conducted on the touch-sensitive display 10 includes manipulating movement of the camera 12 based on the pattern of the plurality of locations 15A-15C on the touch sensitive display 10. As examples, manipulating movement of the camera 12 based on the pattern of the plurality of locations 15A-15C on the touch sensitive display 10 may include (i) adjusting the tilt angle of the camera 12; and/or (ii) adjusting the pan angle of the camera 12.

Figure 2E:
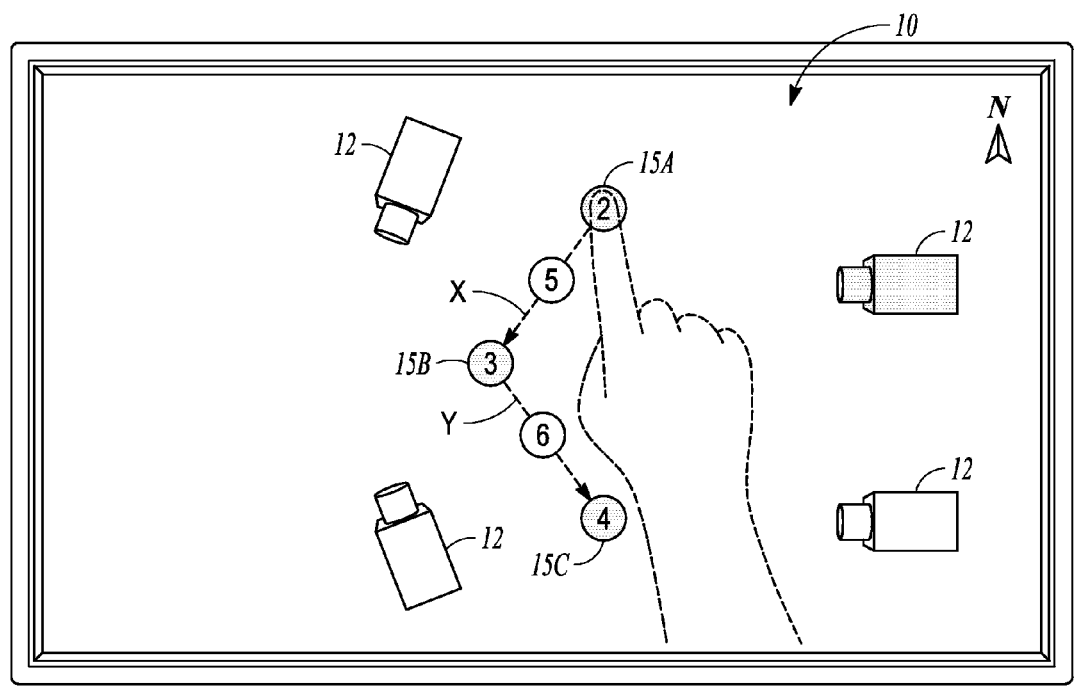
Figure 2F:
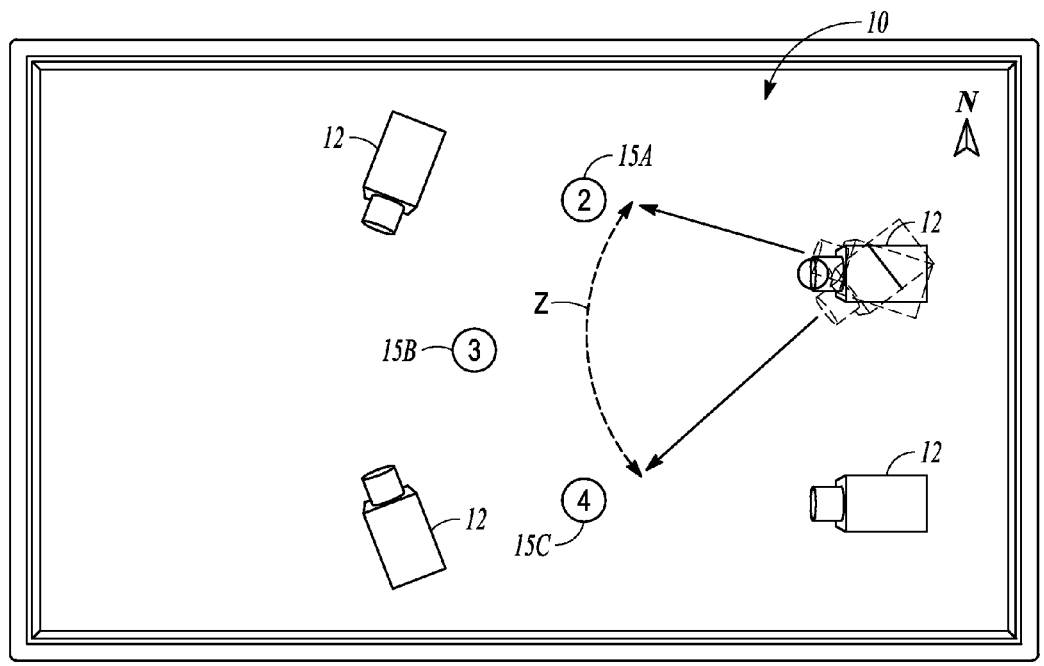

As shown in FIGS. 2E-2F, manipulating the camera 12 based on a gesture conducted on the touch-sensitive display 10 may further include connecting the plurality of locations 15A-15C on the touch sensitive display 10 to define operation of camera 12 (see, e.g., motions X and Y in FIG. 2E). In some embodiments, connecting the plurality of locations 15A-15C on the touch sensitive display 10 to define operation of the camera 12 may include connecting the plurality of locations 15A-15C on the touch sensitive display 10 at a particular rate which determines the speed at which the camera 12 is manipulated (see, e.g., camera 12 movement Z in FIG. 2F).

It should be noted that embodiments are contemplated where the appropriate camera 12 (or cameras 12) are selected based on where the gesture is made on the touch-sensitive display 10 instead of the camera(s) 12 being manually selected by a user.

Figure 3A:
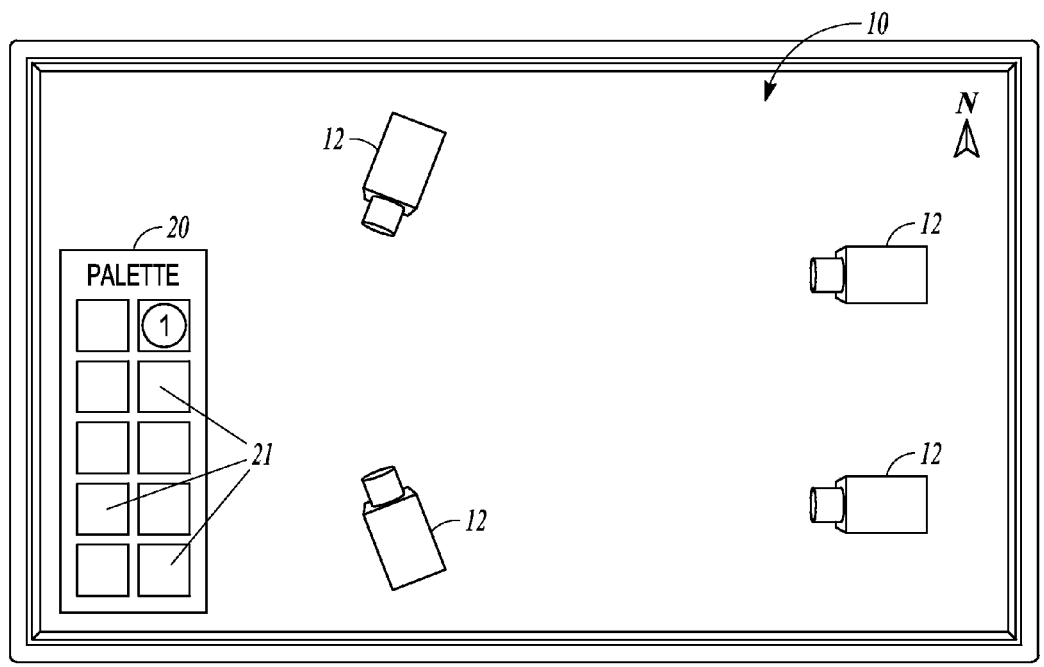
FIGS. 3A-3E illustrate an example method of manipulating operation of a camera based on selection of a menu item on the touch-sensitive display to define a particular camera movement operation.
Figure 3B:
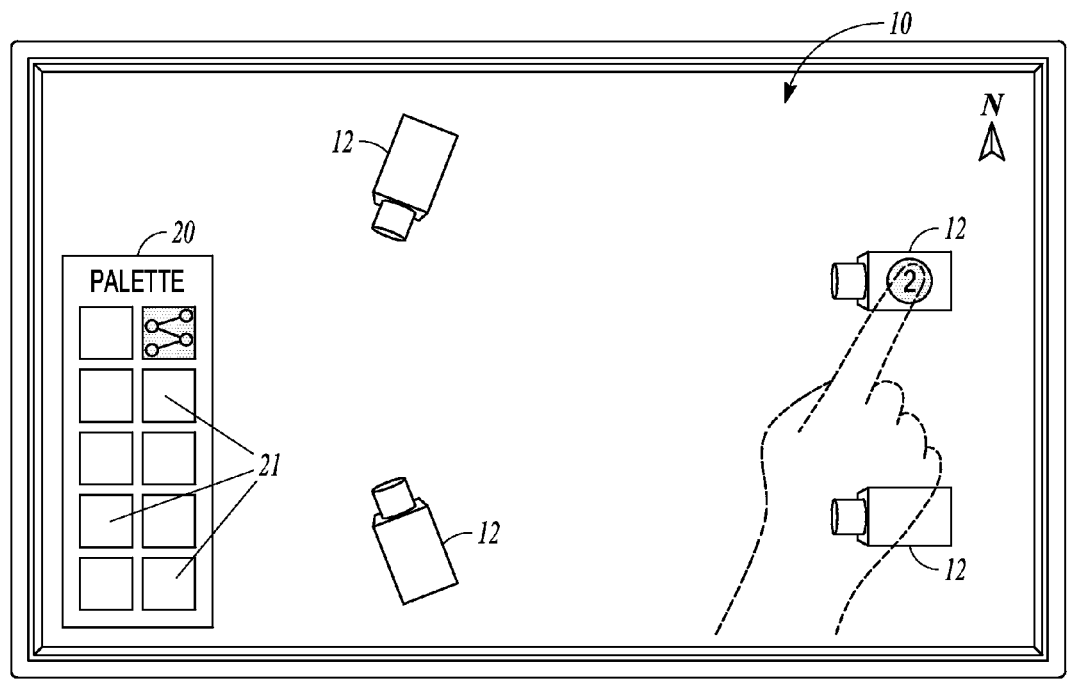

Another example embodiment is illustrated in FIGS. 3A-3F. FIG. 3A illustrates that the method includes showing a menu 20 on the touch-sensitive display 10 that includes a plurality of camera movement operations 21. FIG. 3B illustrates that the method further includes detecting contact with the camera 12 on the touch-sensitive display 10.

Figure 3C:
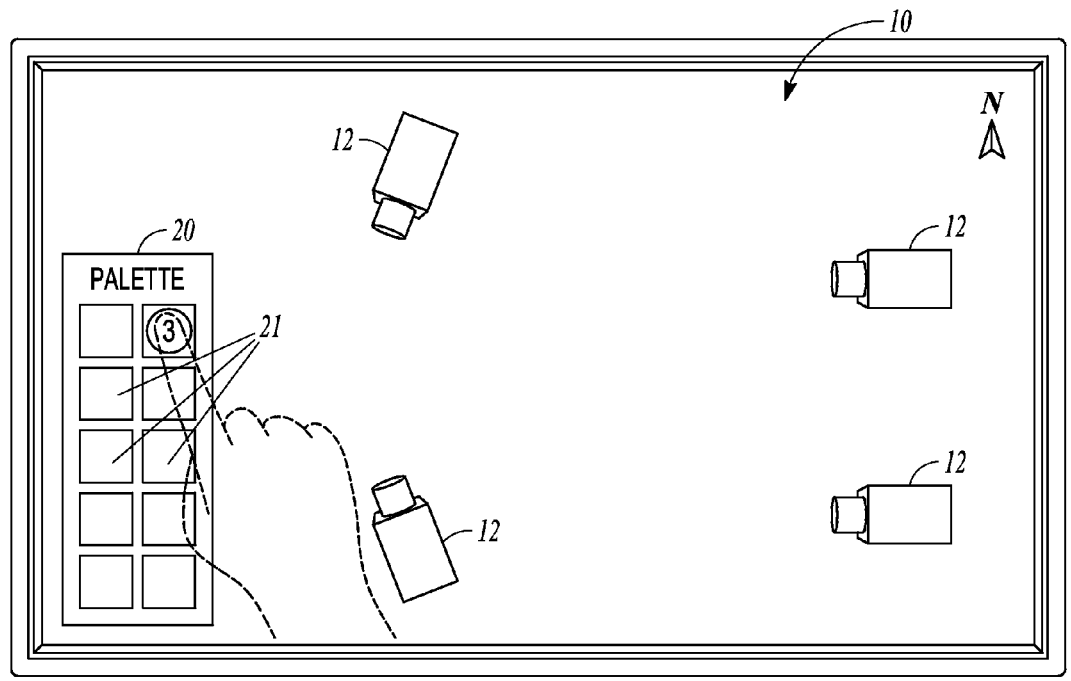
Figure 3D:
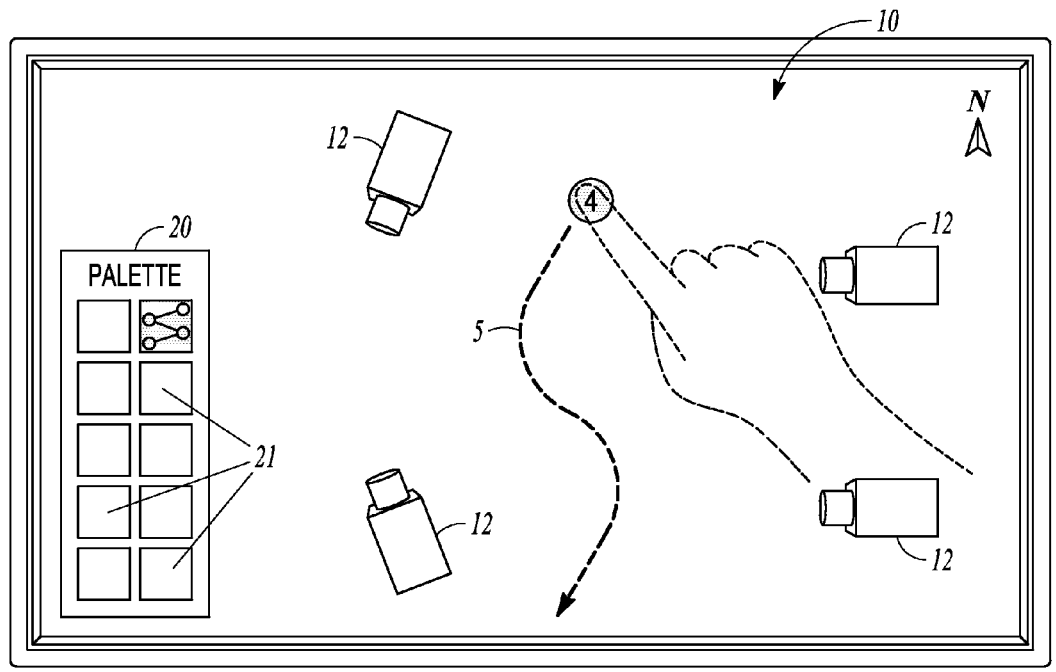
Figure 3E:
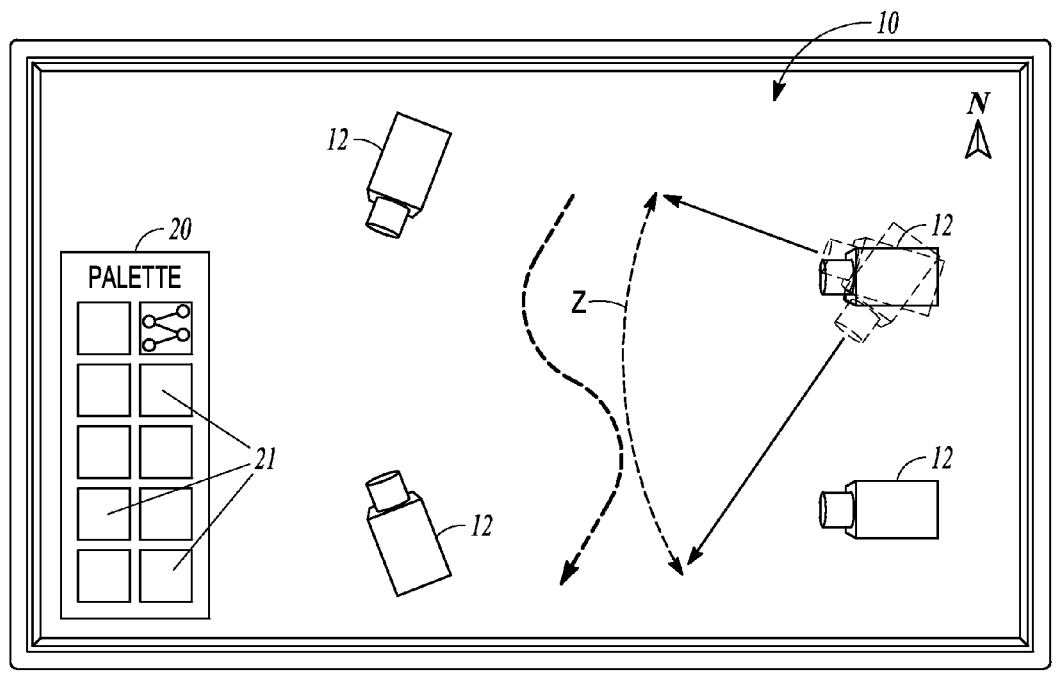

FIG. 3C illustrates that the method further includes detecting contact with the menu 20 on the touch-sensitive display 10 to select a particular camera movement operation 21. FIGS. 3D-3E illustrate that the method further includes manipulating the camera 12 based on a gesture (see, e.g., movement S in FIG. 3D) conducted on the touch-sensitive display 10. In some embodiments, manipulating the camera 12 based on a gesture conducted on the touch-sensitive display includes making the gesture at a particular rate which determines the speed at which the camera is manipulated (note, e.g., camera 12 movement Z in FIG. 3E may be faster or slower depending on speed of the gesture).

It should be noted that embodiments are contemplated where the appropriate camera 12 (or cameras 12) are selected based on where the gesture is made on the touch-sensitive display 10 instead of the camera(s) 12 being manually selected by a user.

Figure 4A:
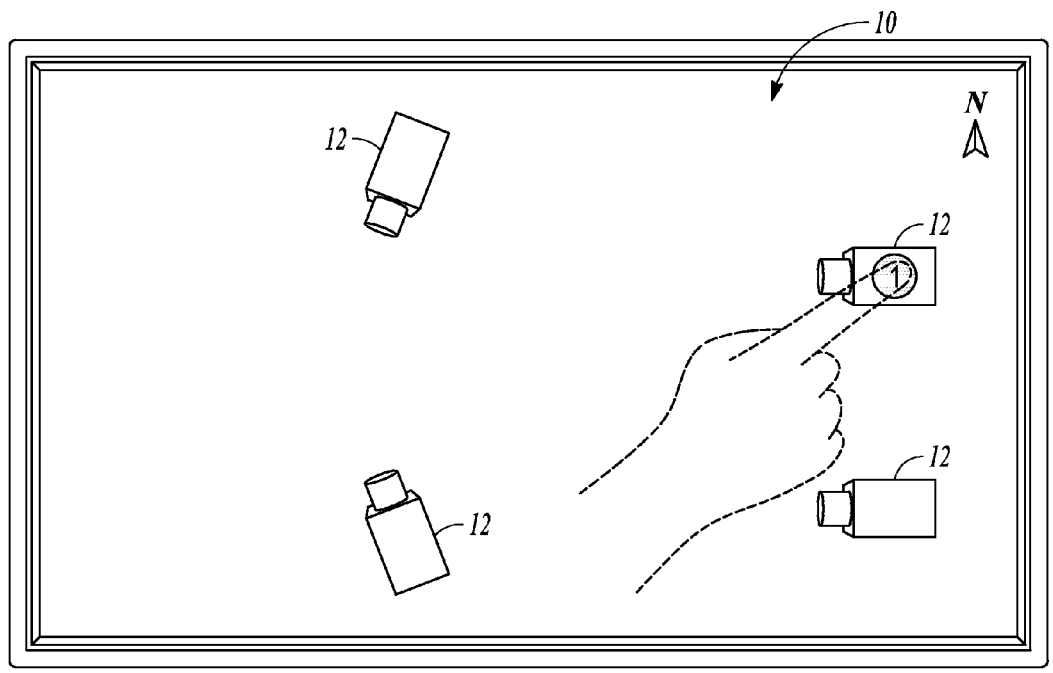
FIGS. 4A-4C illustrate an example method of manipulating the operation of a camera based on a recognized gesture made on a touch-sensitive display.
Figure 4B:
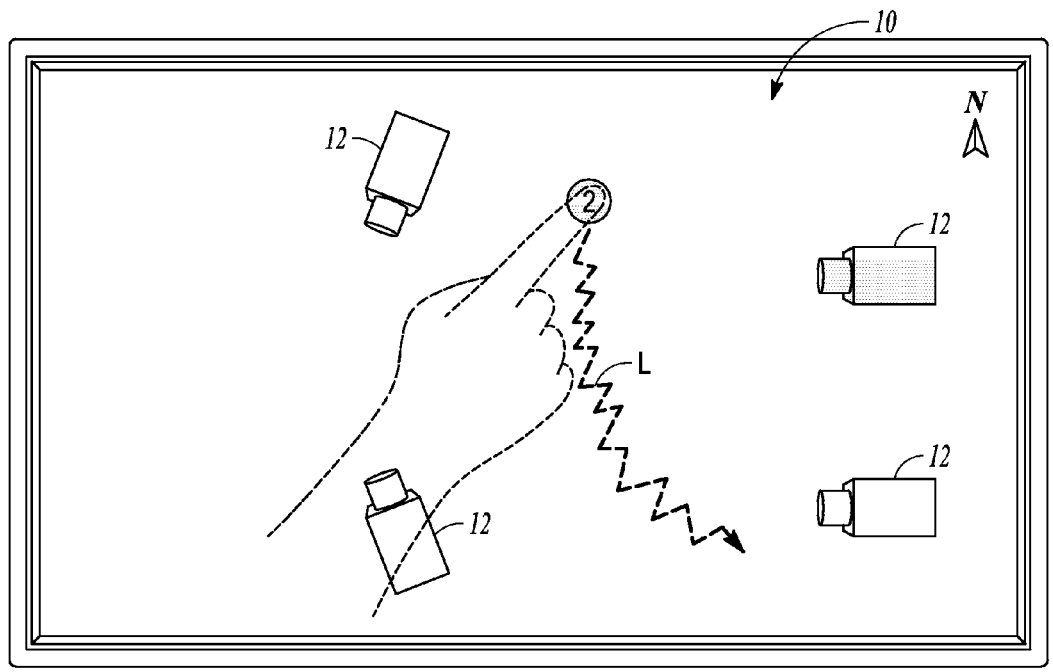
Figure 4C:
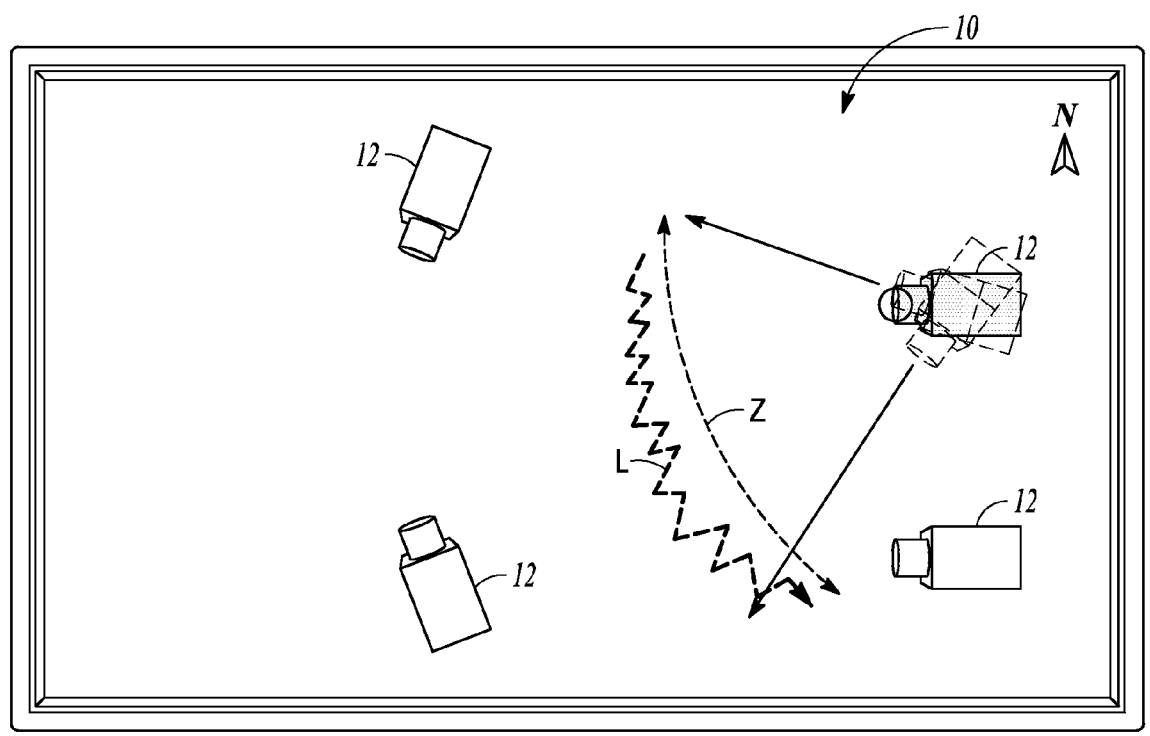

Another example embodiment is illustrated in FIGS. 4A-4C. FIG. 4A illustrates that the method further includes detecting contact with the camera 12 of the camera 12 on the touch-sensitive display 10 (shown as contacting one of the cameras 12).

FIGS. 4B-4C illustrate that the method further includes manipulating the camera 12 based on a gesture conducted on the touch-sensitive display (shown as squiggly line L in FIG. 4B). In the example embodiment that is illustrated in FIGS. 4B-4C the gesture is one of a plurality of recognized predefined gestures where each gesture defines a particular operation of the camera 12.

In some embodiments, manipulating the camera 12 based on a gesture conducted on the touch-sensitive display 10 may includes manipulating zoom functioning of the camera 12 based on the gesture on the touch sensitive display 10. The degree of zoom may depend in part on (i) the relative position of the gesture on the touch sensitive display 10 relative to the camera; and/or (ii) the overall shape of the gesture.

Embodiments are also contemplated where manipulating the camera 12 based on a gesture conducted on the touch-sensitive display 10 includes manipulating movement of the camera 12 based on the gesture on the touch sensitive display 10. As examples, manipulating movement of the camera 12 based on the gesture on the touch sensitive display 10 may include (i) adjusting the tilt angle of the camera 12; and/or (ii) adjusting the pan angle of the camera 12.

In some embodiments, manipulating the camera 12 based on a gesture conducted on the touch-sensitive display 10 may include making the gesture at a particular rate which determines the speed at which the camera 12 is manipulated (note, e.g., camera 12 movement Z in FIG. 4C may be faster or slower depending on speed of the gesture).

It should be noted that embodiments are contemplated where the appropriate camera 12 (or cameras 12) are selected based on where the gesture is made on the touch-sensitive display 10 instead of the camera(s) 12 being manually selected by a user.

Figure 5A:
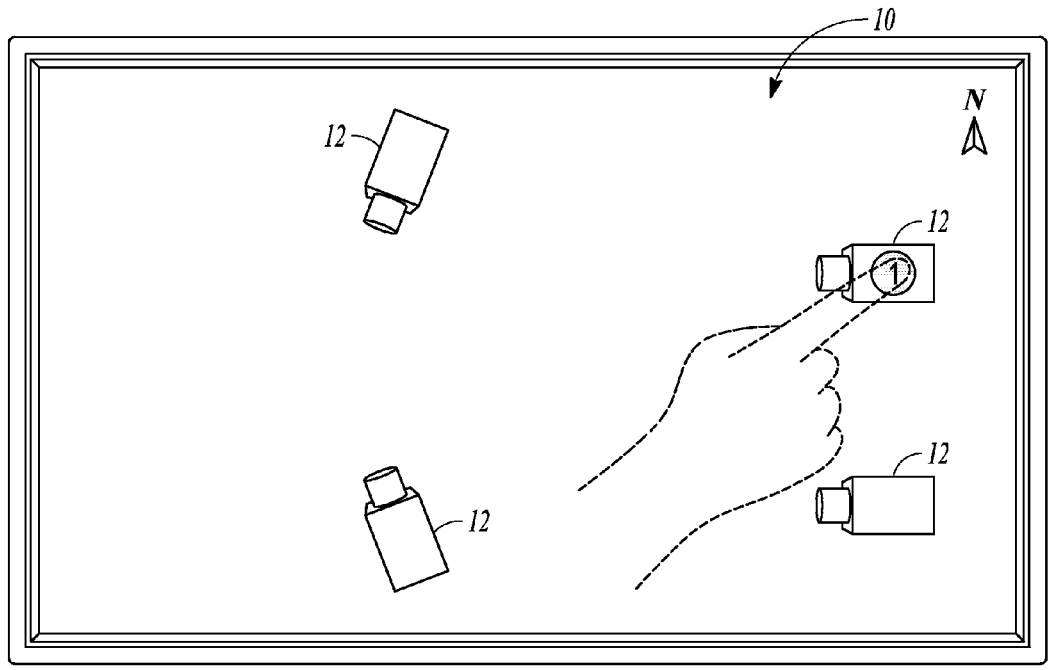
FIGS. 5A-5C illustrate an example method of manipulating the operation of a camera based on selection of an area by making gestures on a touch-sensitive display.
Figure 5B:
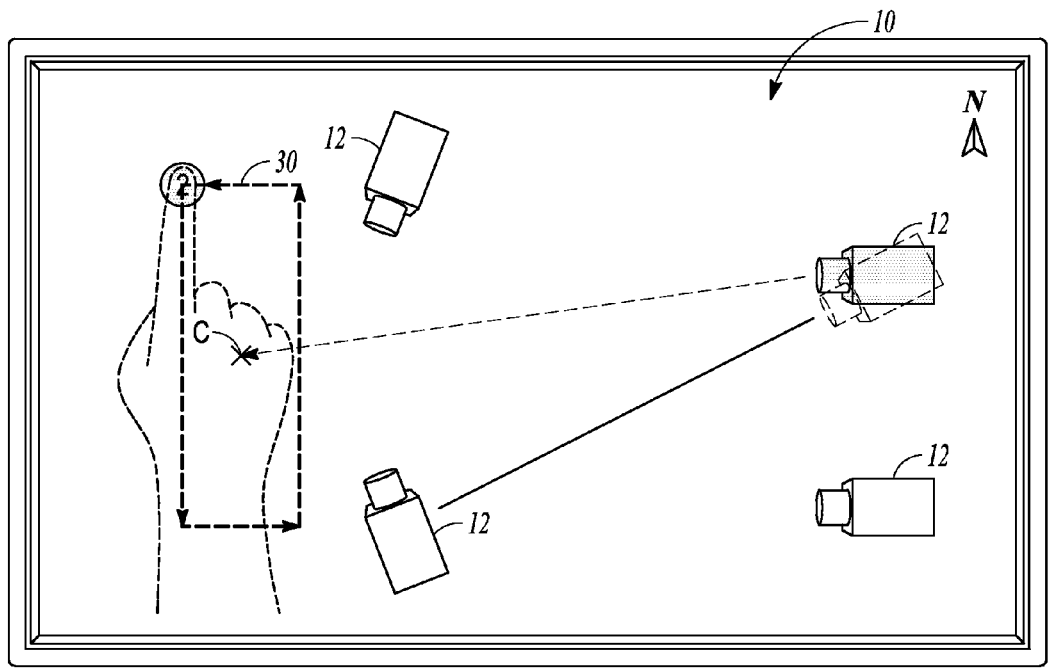
Figure 5C:
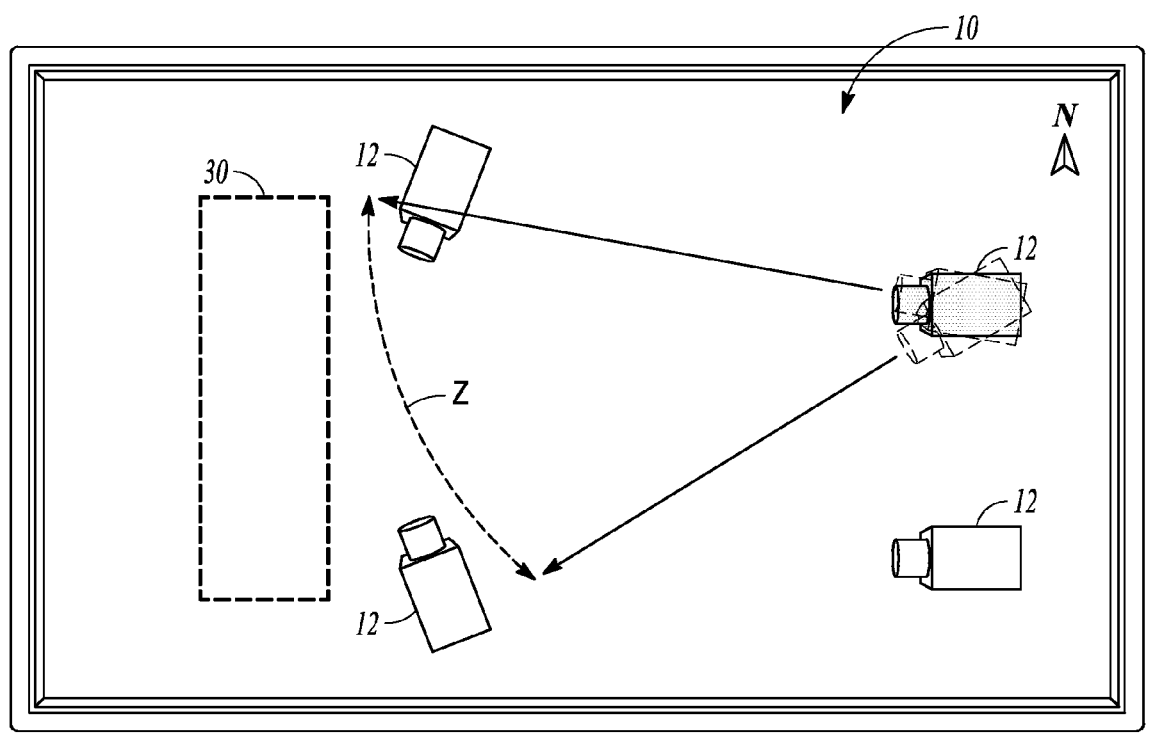

Another example embodiment is illustrated in FIGS. 5A-5C. FIG. 5A illustrates that the method includes detecting contact with the camera 12 of the camera 12 on the touch-sensitive display 10 (shown as contacting one of the cameras 12). FIGS. 5B-5C illustrate that the method further includes manipulating the camera 12 based on selection of an area 30 by making gestures on the touch-sensitive display 10.

In the example embodiment shown in FIG. 5B, manipulating the camera 12 based on selection of an area 30 by making gestures on the touch-sensitive display includes centering the field of view of the camera 12 at the center C of the selected area 30. In the example embodiment shown in FIG. 5C, manipulating the camera 12 based on selection of an area 30 by making gestures on the touch-sensitive display 10 includes moving the camera 12 back and forth across the selected area 30 (see, e.g., motion Z in FIG. 5C).

It should be noted that embodiments are contemplated where the appropriate camera 12 (or cameras 12) are selected based on where the gesture is made on the touch-sensitive display 10 instead of the camera(s) 12 being manually selected by a user.

Figure 6:
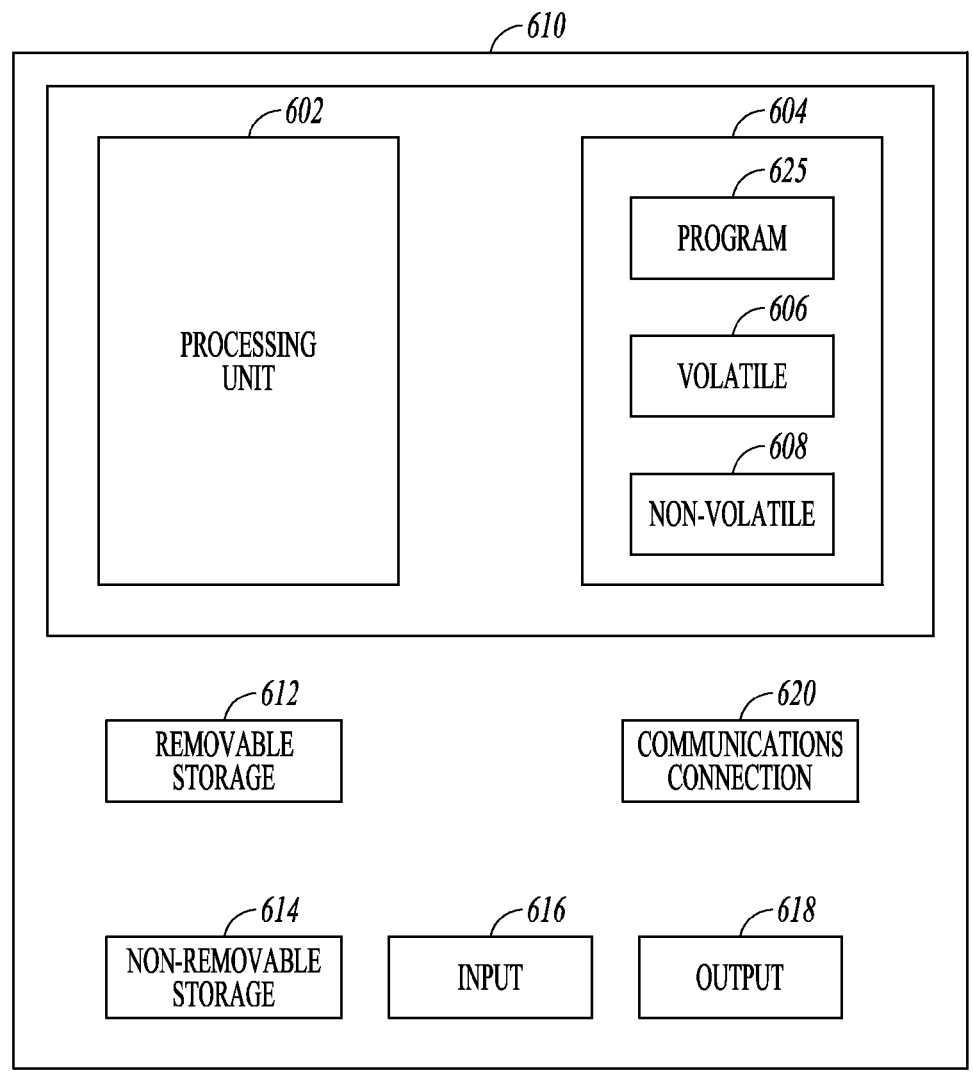
FIG. 6 is a block diagram of an example system for executing the method described herein with reference to FIGS. 1-5.

A block diagram of a computer system that executes programming 625 for performing the above method is shown in FIG. 6. The programming may be written in one of many languages, such as virtual basic, Java and others. A general computing device in the form of a computer 610 may include a processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 610 may include or have access to a computing environment that includes input 616, output 618, and a communication connection 620. The input 616 may be a keyboard and mouse/touchpad, or other type of data input device, and the output 618 may be a display device or printer or other type of device to communicate information to a user. In one embodiment, a touch screen device may be used as both an input and an output device.

The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 610. A hard drive, CD-ROM, and RAM are some examples of articles including a computer-readable medium.

The methods described herein may help security personnel to effectively support security monitoring and response tasks. Users can interact with a touch-sensitive display by using intuitive gestures that support performing tasks and activities such as monitoring un-related assets and/or responding to an incident. The information provided on the display gives the context that is needed for effective interaction by users with assets (e.g., cameras) within a complex environment. Users can effectively interact (i.e., view and/or adjust) with assets using a variety of single-touch and multi-touch gestures on the touch-sensitive display.

The display may show 3-D or 2-D views of an environment depending on what is the most effective representation of a situation (environment and context). The environment (e.g., a building) or assets (e.g., equipment) can be shown on the touch-sensitive display such that a user can easily access and manipulate the assets using gestures on the touch-sensitive display.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A method of displaying items on a touch-sensitive display comprising:
   showing a camera icon on the touch-sensitive display, wherein the touch-sensitive display illustrates a map of an area, wherein the camera icon defines a location of a camera within the area on the map;
   using a digit that is part of a hand to make contact with the camera icon on the touch-sensitive display;
   using a digit that is part of a hand to contact the touch sensitive display at a plurality of locations that are arranged in a pattern; and
   tracing a digit that is part of a hand along the touch sensitive display to connect the pattern formed by the plurality of locations on the touch sensitive display to define operation of camera.

2. The method of claim 1, using a digit that is part of a hand to contact the touch sensitive display at a plurality of locations that are arranged in a pattern includes showing the plurality of locations on the touch-sensitive display after the digit contacts the touch sensitive display at the plurality of locations.

3. The method of claim 2, wherein tracing a digit that is part of a hand along the touch sensitive display to connect the pattern formed by the plurality of locations on the touch sensitive display to define operation of camera includes showing the pattern formed by the plurality of locations on the touch-sensitive display after the digit traces the pattern the touch sensitive display.

4. The method of claim 1, wherein showing a camera icon on the touch-sensitive display includes showing a two dimensional map on the touch-sensitive display.

5. The method of claim 1, wherein showing a camera icon on the touch-sensitive display includes showing a three dimensional model on the touch-sensitive display.

6. The method of claim 1, wherein tracing a digit that is part of a hand along the touch sensitive display to connect the pattern formed by the plurality of locations on the touch sensitive display to define operation of camera includes manipulating zoom functioning of the camera based on the pattern of the plurality of locations on the touch sensitive display.

7. The method of claim 1, wherein tracing a digit that is part of a hand along the touch sensitive display to connect the pattern formed by the plurality of locations on the touch sensitive display to define operation of camera includes manipulating movement of the camera based on the pattern of the plurality of locations on the touch sensitive display.

8. The method of claim 7, wherein manipulating movement of the camera based on the pattern of the plurality of locations on the touch sensitive display includes adjusting the tilt angle of the camera.

9. The method of claim 7, wherein manipulating movement of the camera based on the pattern of the plurality of locations on the touch sensitive display includes adjusting the pan angle of the camera.

\* \* \* \* \*